US011422057B2

(12) United States Patent
Wang et al.

(10) Patent No.: US 11,422,057 B2
(45) Date of Patent: Aug. 23, 2022

(54) DYNAMIC FIVE-HOLE PROBE

(71) Applicant: INSTITUTE OF ENGINEERING THERMOPHYSICS, CHINESE ACADEMY OF SCIENCES, Beijing (CN)

(72) Inventors: Sichen Wang, Beijing (CN); Juan Du, Beijing (CN); Fan Li, Beijing (CN); Zhiting Tong, Beijing (CN); Chaoqun Nie, Beijing (CN); Hongwu Zhang, Beijing (CN)

(73) Assignee: INSTITUTE OF ENGINEERING THERMOPHYSICS, CHINESE ACADEMY OF SCIENCES, Beijing (CN)

( * ) Notice: Subject to any disclaimer, the term of this patent is extended or adjusted under 35 U.S.C. 154(b) by 349 days.

(21) Appl. No.: 16/612,873

(22) PCT Filed: Oct. 31, 2017

(86) PCT No.: PCT/CN2017/108562
§ 371 (c)(1),
(2) Date: Nov. 12, 2019

(87) PCT Pub. No.: WO2018/205507
PCT Pub. Date: Nov. 15, 2018

(65) Prior Publication Data
US 2020/0217748 A1 Jul. 9, 2020

(30) Foreign Application Priority Data
May 12, 2017 (CN) .......................... 201710342115.2

(51) Int. Cl.
*G01M 9/06* (2006.01)
*G01P 5/165* (2006.01)
*G01F 1/46* (2006.01)

(52) U.S. Cl.
CPC .............. *G01M 9/065* (2013.01); *G01F 1/46* (2013.01); *G01P 5/165* (2013.01)

(58) Field of Classification Search
CPC ... G01P 5/16; G01P 5/165; G01F 1/46; G01L 19/0007; G01L 19/0038; G01L 19/06; G01L 19/0609; G01M 9/065
See application file for complete search history.

(56) References Cited

U.S. PATENT DOCUMENTS

| | | | | |
|---|---|---|---|---|
| 3,318,146 | A | * | 5/1967 | Hagen .................... B64D 43/00 73/180 |
| 4,836,019 | A | * | 6/1989 | Hagen .................... G01P 5/165 73/180 |
| 7,010,970 | B2 | * | 3/2006 | Rediniotis ............... G01P 5/165 73/170.11 |

FOREIGN PATENT DOCUMENTS

| CN | 203053472 U | | 7/2013 |
|---|---|---|---|
| CN | 206020457 U | * | 3/2017 |

(Continued)

OTHER PUBLICATIONS

International Search Report dated Feb. 12, 2018 in corresponding International application No. PCT/CN2017/108562; 6 pages.
(Continued)

*Primary Examiner* — Justin N Olamit
(74) *Attorney, Agent, or Firm* — Maier & Maier, PLLC

(57) ABSTRACT

A dynamic five-hole probe includes a pressure sensing part, a pressure measuring hole transition section, a pressure acquisition section, dynamic pressure sensors and flexible wall pressure buffering tubes, the pressure sensing part being provided with pressure measuring holes to sense three dimensional dynamic pressure components of an airflow; the pressure measuring hole transition section transits from an inlet end surface five-hole structure into an outlet end surface five-hole structure; the pressure acquisition section has therein a centrally symmetric pressure measuring hole structure; pressure sensor mounting holes are in communication with the five pressure measuring holes; each of the dynamic pressure sensors is mounted in a corresponding one of the sensor mounting holes to measure a dynamic pressure (Continued)

of the airflow. The pressure sensing part may have a diameter of 3 mm or less.

15 Claims, 3 Drawing Sheets

(56) References Cited

FOREIGN PATENT DOCUMENTS

| CN | 206020457 U | 3/2017 |
|---|---|---|
| CN | 107101798 A | 8/2017 |
| CN | 206725183 U | 12/2017 |

OTHER PUBLICATIONS

Written Opinion of the International Searching Authority dated Feb. 12, 2018 in corresponding International application No. PCT/CN2017/108562; 4 pages.

Chinese Office Action dated Apr. 3, 2018 in corresponding Chinese application No. 201710342115.2; 11 pages.

Li, et al., "A Technique to Calibrate Cavity Effect in Unsteady Pressure Probes with High Frequency Response", Journal of Aerospace Power, Dec. 31, 2011, pp. 2749-2756, vol. 26; 8 pages including English-language Abstract.

Wang, et al., "Construction and Calibration of Five-hole Probe", Modem Machinery, Dec. 31, 2012, pp. 19-22, No. 4; 4 pages including English-language Abstract.

Georgiou, et al., "Fabrication and calibration of a sub-miniature 5-hole probe with embedded pressure sensors for use in extremely confined and complex flow areas in turbomachinery research facilities", Flow Measurement and Instrumentation, Jul. 18, 2014, pp. 54-63, vol. 39; 10 pages.

Yasa, et al. "Robust procedure for multi-hole probe data processing", Flow Measurement and Instrumentation, 2012, pp. 46-54, vol. 26; 9 pages.

* cited by examiner

DYNAMIC FIVE-HOLE PROBE

CROSS-REFERENCE TO RELATED APPLICATIONS

This application is a Section 371 National Stage Application of International Application No. PCT/CN2017/108562, filed on Oct. 31, 2017 and entitled with "DYNAMIC FIVE-HOLE PROBE", and claims priority to Chinese Application No. 201710342115.2, filed on May 12, 2017 and entitled with "DYNAMIC FIVE-HOLE PROBE", the contents of which are incorporated herein by reference in their entirety.

FIELD OF THE DISCLOSURE

The disclosure relates to a field of flow field dynamic measurement technology in the power electronics industry, and in particular to a dynamic five-hole probe.

DESCRIPTION OF THE RELATED ART

Dynamic measurement technology plays an important role in experimental measurement and performance test of impeller machinery. Especially as research on the flow inside the impeller machinery is gradually deepened to the full three-dimensional viscosity level, the level of high-precision measurement technology for a three-dimensional unsteady flow field more and more determines the development level of impeller machinery technology. A real flow field inside the impeller machinery includes a variety of three-dimensional unsteady flow structures, and mutual coupling between various complex flow fields increases the difficulty of measurement, which brings more challenges to dynamic measurement technology.

The development of impeller machinery dynamic measurement technology is faced with many contradictions. It can be known from the development history of measurement technology that, the pneumatic probe technology based on semiconductor silicon piezoresistive sensor has the advantages of high frequency response and good durability, but the interference of the probe on the airflow cannot be prevented since it belongs to a contact measurement. However, due to the size of the sensor, the geometry of the probe cannot be reduced indefinitely, which greatly limits the development of the pneumatic probe technology. Another typical contact measurement technology relates to thermal wire and thermal film speedometers based on the principle of heat balance. Such a technology can greatly reduce the size of the probe tip, but its inconvenient operation and easy damage limit its applications in a wide range in the dynamic measurement of the impeller machinery, especially in the industrial field. In recent years, non-contact measurement technologies, such as particle imaging velocity (PIV) measurement technology, laser Doppler velocity (LDV) measurement technology and pressure sensitive paint (PSP) technology, have developed very rapidly. These technologies can meet the requirements for spatial resolution well and solve the problem of interference to the flow field, but the current technical maturity thereof cannot fully meet the measurement requirements of the unsteady flow field. In general, each type of dynamic measurement technology has its advantages and disadvantages. The measurement method should be chosen to be appropriate to the characteristics of the object to be measured, such as spatial resolution requirements, dynamic frequency response requirements, measurement temperature range, installation conditions of test bench, etc. With the rapid development of advanced non-contact measurement technology, the development trend of dynamic measurement system will inevitably relate to the replacement of traditional measurement technology with new technology. Based on the current level and demand of dynamic measurement technology, the contact measurement technology, by relying on the miniaturization development of dynamic pressure sensor will still occupy a major market position and still play an important role in the experimental measurement of impeller machinery.

Pneumatic probe technology is one of the most developed and widely used contact dynamic measurement technologies. It has high dynamic frequency response, stable system and convenient operation. The dynamic pneumatic probe system is generally consisted of a pneumatic probe, a signal amplifier and a dynamic data acquisition system. The pneumatic probe is the core part of the dynamic measurement system and is generally composed of a dynamic sensor, a probe tip and a probe holder. After a development of more than half a century, miniaturization and high-frequency response capability of the semiconductor silicon piezoresistive sensor has been achieved, and the available dynamic frequency response can generally be 30-50 kHz or more. This is sufficient for measurement of an unsteady flow field of the general impeller machinery (in which the maximum passing frequency of a blade is generally 10 kHz to 15 kHz). However, if a three-dimensional large gradient flow field needs to be measured, it is often necessary to design the installation manner of the probe tip and of the sensor of the probe, including aerodynamic design and mechanical design. That is, the degree of interference of shapes and sizes of the probe tip and a holder to the flow field to be measured and the feasibility for machining the probe need to be considered. Comprehensively considering the mechanical design and the pneumatic design, various design goals of the dynamic pneumatic probe system are often contradictory to each other. The following are analyses on some key issues for the design of the pneumatic probe.

The first problem relates to the frequency response of the dynamic probe. One of the most important indicators of dynamic measurement quality is the time resolution of the measurement system, i.e. the dynamic frequency response capability. Exposing the dynamic pressure sensor to the flow field to be measured or installing the dynamic pressure sensor in the probe tip with being flush with wall surface of the probe tip may maximize the frequency response of the sensor, but the shape and size of the sensor limits the design freedom of the probe tip, which results in that the size of the probe tip cannot be designed to be very small. In addition, the high temperature environment of the airflow to be measured may affect the measurement accuracy of the sensor and may cause damage to the silicon piezoresistive diaphragm. Therefore, many designers try to avoid the above limitations by embedding the sensor in the probe tip or in the holder. However, the problem coming with the built-in installation of the sensor is in that a cavity between the measuring surface of the sensor and the surface of the probe tip may result in the resonance effect and the attenuation effect on the energy of the measured dynamic signal, which will lead to narrowed working frequency band of the dynamic probe and reduce dynamic measurement accuracy. For example, for the dynamic five-hole probe developed by Aeroprobe in the United States in 2010, although the diameter of the probe tip is reduced to be about 2 mm, its dynamic frequency response is only about 4 kHz due to the existence of the cavity-effect, which obviously cannot meet the requirements in unsteady measurement of the impeller machinery.

The second problem relates to the spatial resolution of the dynamic probe, that is, the size of the probe tip. The problem of interacting with an object to be measured exists in any contact measuring tool. Thus, the design target of the probe tip and the holder is to minimize the characteristic size, i.e. the spatial resolution of the probe, while ensuring that the probe can perform an accurate measurement. There are many choices for the geometry of the probe tip, such as cylindrical shape, spherical shape, wedge-shaped shape, ellipsoidal shape, etc. The size and the machining manner of the probe tip depend on the number of sensors, i.e., the number of pressure measuring holes, such as single, three, four, or seven holes. In general, the more the pressure measuring holes exists, the more physical quantities of the flow field can be measured by the probe, which may describe the three-dimensional flow field to be measured in more detail. However, increasing the number of the pressure measuring holes also increases the measurement error and the difficulty of machining and operating the probe to some extent. And more importantly, the complex probe tip structure limits the minimum size of the probe tip. For example, a five-hole probe with a spherical probe tip developed by Kerrebrock et al. from the Massachusetts Institute of Technology (MIT) in 1980 has a dynamic frequency response of about 15 kHz, but the probe tip has a diameter larger than 5 mm Epstein et al. from the same MIT develops, based on Kerrebrock's design, a four-hole probe with a cylindrical probe tip, which probe has a frequency response of 20 kHz and in which the cylindrical probe tip has a diameter of 3.3 mm. However, the maximum distance between the four sensors is larger than those developed previously, which somewhat reduces the spatial resolution of the probe.

The third problem relates to costs for manufacture and maintenance of the probe. To balance the dynamic frequency response and the spatial resolution, many designers use exposed silicon piezoresistive diaphragms instead of armored pressure sensors, which greatly reduces the size of the sensor and provides great freedom in design and machining of the probe tip. However, the machining of the microminiature probe tip with a plurality of holes and the installation of silicon piezoresistive diaphragms require very precise machining equipment and specialized machining techniques, and the exposed silicon piezoresistive diaphragms still have the problem of temperature drift in the high-temperature flow field to be measured and are easily subjected to damage. These bring great difficulty to the design and machining of the probe, and greatly increase the costs for manufacture and maintenance of the probe. For example, for the five-hole dynamic probe developed by Kulite Sensor Corporation in 2011, although the diameter of its probe tip is larger than 6 mm, its dynamic frequency response is up to 80 kHz. Although this may fully reflect its technical strength as a professional pressure sensor company, but the price of the product of this model is more than 100,000 US dollars. So the manufacturing cost is very high.

The above three problems are the difficulties that will be faced in the design and manufacturing process of the dynamic pneumatic probe. At present, there is no probe that can completely solve these three problems. All the probes can only be prominent in a certain aspect according to the needs of the flow field to be measured. That is, a probe may meet the requirements for high performance in one certain aspect, but has to compromise on certain indicators that are less important.

SUMMARY

There is provided a dynamic five-hole probe including a pressure sensing part, a pressure measuring hole transition section and a pressure acquisition section; wherein the pressure sensing part is placed in a flow field to be measured when in use, and the pressure sensing part is provided therein with sensing part pressure measuring holes; wherein the sensing part pressure measuring holes are transited into acquisition section pressure measuring holes of the pressure acquisition section via transition section pressure measuring holes of the pressure measuring hole transition section, and wherein the acquisition section pressure measuring holes of the pressure acquisition section are configured to measure a dynamic pressure of an airflow.

BRIEF DESCRIPTION OF THE DRAWINGS

The drawings, which constitute a part of the specification, are provided to understand the disclosure better, and are intended to explain the present disclosure together with detailed description of embodiments without constituting a limitation to the present disclosure. In the drawing.

DETAILED DESCRIPTION OF EMBODIMENTS

Figure 1:
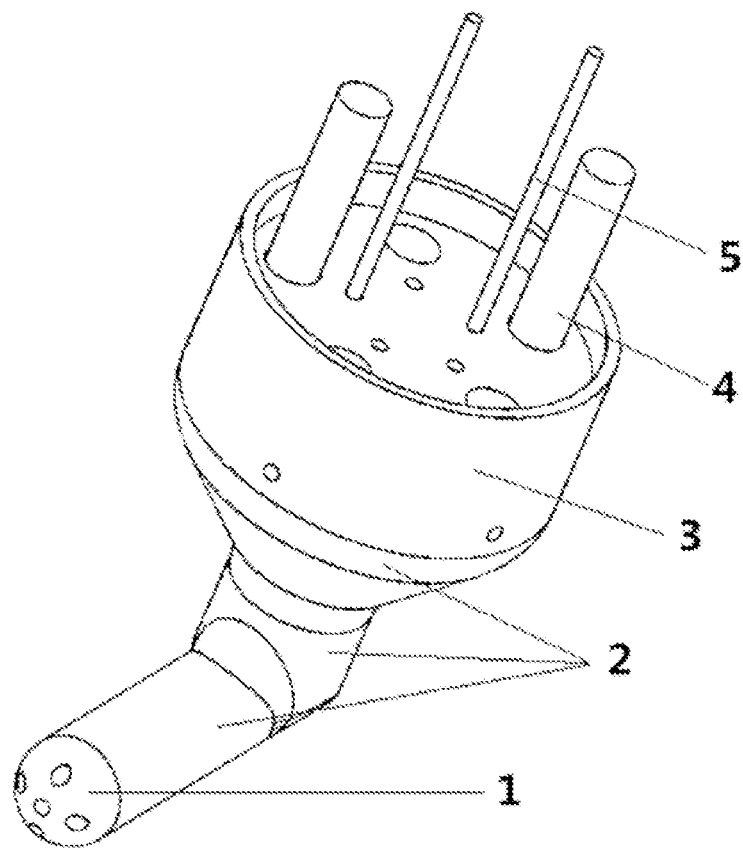
FIG. 1 is a diagram showing the structure of a main body of a dynamic five-hole probe according to an embodiment of the present disclosure.

To make the purpose, the technical solutions and the advantages of the present disclosure clearer and more understandable, the present disclosure will be further described in detail below in connection with specific embodiments of the disclosure with reference to the drawings.

The technical solutions in the embodiments of the present disclosure will be clearly and completely described in the following with reference to the accompanying drawings in the embodiments of the present disclosure. It is apparent that the described embodiments are only a part, rather than all, of the embodiments of the present disclosure. All other embodiments obtained by those skilled in the art based on the described embodiments of the present disclosure without creative efforts will fall within the scope of the present disclosure. It should also be noted that the present disclosure is not strictly limited to the specific parameter values provided by the present disclosure, but is approximate to the values within acceptable tolerance limit or design constraints.

According to one embodiment of the present disclosure, the dynamic five-hole probe further includes pressure sensors, wherein the pressure acquisition section is provided with sensor mounting holes, the sensor mounting holes are communicated with the acquisition section pressure measuring holes, respectively, and the pressure sensors are disposed in the sensor mounting holes to measure the dynamic pressure of the airflow.

According to one embodiment of the present disclosure, the dynamic five-hole probe further includes pressure buffering tubes, wherein a tail end of each of the pressure buffering tubes is closed, and the other end of each of the pressure buffering tubes is communicated with a corresponding one of the acquisition section pressure measuring holes to weaken a cavity-effect.

According to one embodiment of the present disclosure, the pressure sensing part has a hemispherical structure, the number of sensing part pressure measuring holes is five, and the five sensing part pressure measuring holes are evenly arranged on a hemispherical surface of the hemispherical structure in a plum blossom-shaped structure and penetrate through the hemispherical structure to a bottom section of the hemispherical structure so as to sense three-dimensional dynamic pressure components of the airflow to be measured.

According to one embodiment of the present disclosure, the pressure measuring hole transition section is of an L-shaped structure including a horizontal transition section and a vertical transition section, wherein the horizontal transition section is connected to the pressure sensing part at an upstream position such that the horizontal transition section and the pressure sensing part have a same diameter at the connection position therebetween, and the vertical transition section is connected to the pressure acquisition section at a downstream position such that the vertical transition section and the pressure acquisition section have a same diameter at the connection position therebetween; and wherein each of the transition section pressure measuring holes is L-shaped, and transits one of the sensing part pressure measuring holes to a corresponding one of the acquisition section pressure measuring holes.

According to one embodiment of the present disclosure, the sensing part pressure measuring holes, the transition section pressure measuring holes and the acquisition section pressure measuring holes are communicated with each other in one-to-one correspondence, and an outlet section of each of the acquisition section pressure measuring holes is the same in area as an inlet section of the acquisition section pressure measuring hole.

According to one embodiment of the present disclosure, a bottom of each of the sensor mounting holes is communicated with a corresponding one of the acquisition section pressure measuring holes through a small hole.

According to one embodiment of the present disclosure, the acquisition section pressure measuring holes form a centrally symmetrical structure; the number of the sensor mounting holes is the same as the number of the acquisition section pressure measuring holes, and the sensor mounting holes form a centrally symmetrical structure.

According to one embodiment of the present disclosure, the transition section pressure measuring holes of the horizontal transition section extend in different directions and with lengths toward a same circumference, and the transition section pressure measuring holes continue to change in direction in the vertical transition section, so as to form a centrally symmetrical structure at an outlet end of the vertical transition section.

According to one embodiment of the present disclosure, the pressure sensing part, the pressure measuring hole transition section and the pressure acquisition section are each made of a rigid material, and the pressure buffering tubes are made of a flexible pipe material.

The present disclosure provides a dynamic five-hole probe which may be applied to three-dimensional unsteady flow field measurement of a impeller machinery such as an aeroengine and a gas turbine. FIG. 1 is a diagram showing the structure of a main body of a dynamic five-hole probe according to an embodiment of the present disclosure. As shown in FIG. 1, the dynamic five-hole probe includes a pressure sensing part 1, a pressure measuring hole transition section 2, a pressure acquisition section 3, and a dynamic pressure sensor 4 and flexible wall pressure buffering tubes 5 which are sequentially arranged from bottom to top.

The pressure sensing part 1 has a hemispherical structure with a hemispherical probe tip having a diameter of less than 3 mm, and preferably, having a diameter of 2.8 mm Five sensing part pressure measuring holes 601 penetrate from a hemispherical outer surface to a bottom cross section of the hemispherical structure and are evenly arranged in a plum blossom-shaped structure to sense three-dimensional dynamic pressure components of an airflow to be measured. Preferably, the diameter of the pressure measuring hole is 0.3 mm.

The pressure measuring hole transition section 2 has an L-shaped structure, including a horizontal transition section and a vertical transition section. The horizontal transition section is connected to the hemispherical probe tip at an upstream position such that the horizontal transition section and the hemispherical probe tip have a same outer diameter at the connection position therebetween, and the vertical transition section is connected to the pressure acquisition section 3 at a downstream position such that the vertical transition section and the pressure acquisition section have a same outer diameter at the connection position therebetween. The outer diameter of the horizontal transition section is substantially constant. The vertical transition section may be funnel-shaped, and an area of one end of the vertical transition section connected to the pressure acquisition section 3 is larger than that of the other end connected to the horizontal transition section. A right-angled corner at which the horizontal transition section and the vertical transition section are connected may have a smoothing structure with a circular-arc chamfered corner for reducing the interference and clogging effect on the airflow to be measured. Preferably, the horizontal transition section has a length of 10 mm and the vertical transition section has a diameter of 7 mm Five L-shaped transition section pressure measuring holes 602, which are in one-to-one correspondence with and communication with the five sensing part pressure measuring holes of the hemispherical probe tip, are provided inside the pressure measuring hole transition section. The plum blossom-shaped five-hole structure at an inlet end surface is transited via the five transition section pressure measuring holes to a centrally symmetrical five-hole structure at an outlet end surface. The five transition section pressure measuring holes also form a generally L-shaped structure in which horizontal vents in the horizontal transition section are transformed to vertical vents in the vertical transition section, and the inner diameter of each horizontal vent is substantially the same as that of the corresponding vertical vent.

Figure 2A:
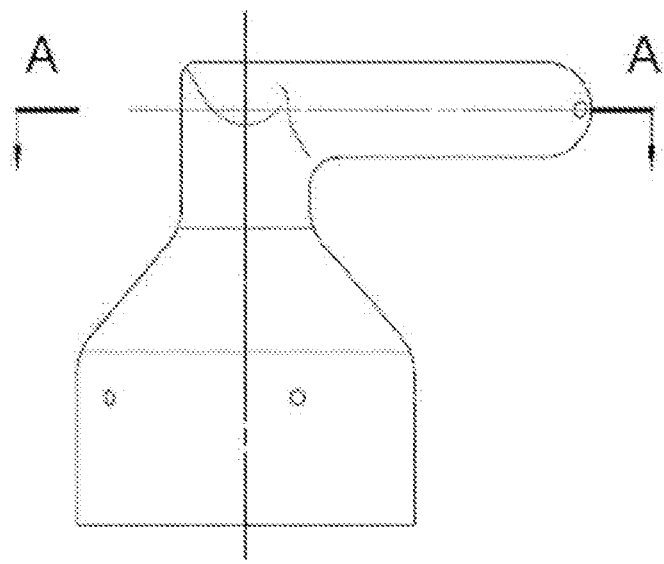
FIG. 2A is a front view of the structure of a horizontal transition section of a dynamic five-hole probe according to an embodiment of the present disclosure.
Figure 2B:
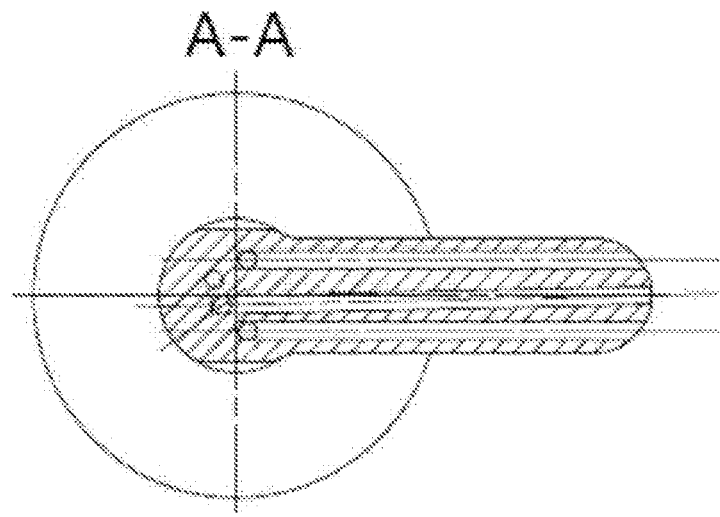
FIG. 2B is a cross-sectional view showing the structure of pressure measuring holes inside a horizontal transition section of a dynamic five-hole probe according to an embodiment of the present disclosure.
Figure 3A:
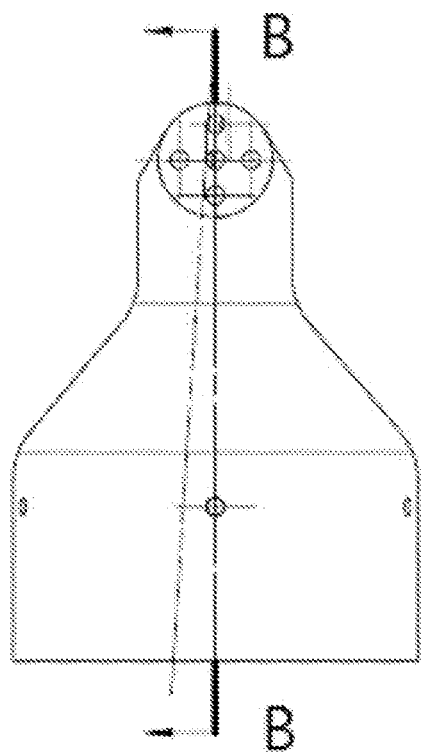
FIG. 3A is a side view showing the structures of a pressure measuring hole transition section and a pressure acquisition section of a dynamic five-hole probe according to an embodiment of the present disclosure.
Figure 3B:
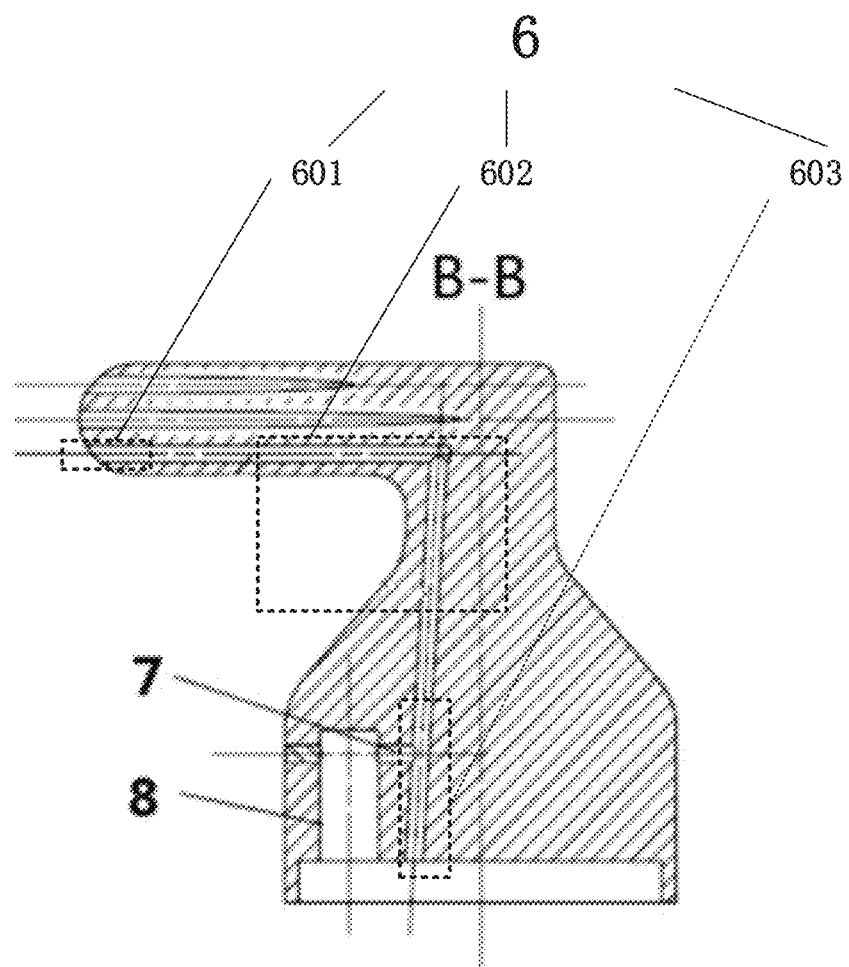
FIG. 3B is a cross-sectional view showing the structures of a pressure measuring hole transition section and a pressure acquisition section of a dynamic five-hole probe according to an embodiment of the present disclosure.

FIGS. 2A and 2B are respectively structural diagrams of a horizontal transition section of a dynamic five-hole probe and pressure measuring holes therein according to an embodiment of the present disclosure, and FIGS. 3A and 3B are respectively structural diagrams of the pressure measuring hole transition section and the pressure acquisition section of the dynamic five-hole probes according to an embodiment of the present disclosure and pressure measuring hole therein. As shown in FIGS. 2A to 3B, the structure formed by the five transition section pressure measuring holes inside the pressure measuring hole transition section 2 will be designed with particular paths to achieve the purpose of transiting the plum blossom-shaped structure at the inlet into the centrally symmetric structure at the outlet. As can be seen from FIGS. 2A and 2B, in the horizontal transition section of the pressure measuring hole transition section, the five holes forming the plum blossom-shaped structure are firstly extended toward a same circumference, with each hole having different direction and length from the other holes. As can be seen from FIGS. 3A and 3B, the pressure measuring holes 6 continue to change their direction in the vertical transition section, and ultimately form a standard centrally symmetrical structure in the pressure acquisition section.

The pressure acquisition section 3 is a signal acquisition site for the dynamic pressure of the airflow. Five acquisition section pressure measuring holes 603 forming a centrally symmetric structure are provided in the pressure acquisition section, and the five acquisition section pressure measuring holes are in one-to-one correspondence with and communication with the five holes in the outlet cross section of the pressure measuring hole transition section. Five sensor mounting holes in one-to-one correspondence with the acquisition section pressure measuring holes are provided and also form a centrally symmetric structure. Each sensor mounting hole is communicated with the corresponding acquisition section pressure measuring hole at the bottom of the sensor mounting hole, so that the pressure sensors can perform the pressure measurement of the airflow.

Five dynamic pressure sensors 4 are respectively installed in the five sensor mounting holes 8 inside the pressure acquisition section 3 and configured for measuring a dynamic total pressure signal. Preferably, the dynamic pressure sensor is a columnar pressure sensor with a diameter of 1.4 mm and a length of 10 mm. As shown in FIG. 3B, each of the sensor mounting holes is communicated at the bottom with the corresponding pressure measuring hole 6 through a small hole 7. Preferably, the depth of the sensor mounting hole is 5 mm, and a half of each of the sensors is buried in the pressure acquisition section by welding or bonding to perform the measurement of the dynamic pressure signal.

The five flexible wall pressure buffering tubes 5 with tail ends closed are respectively communicated with the five acquisition section pressure measuring holes inside the pressure acquisition section 3, and are installed downstream of the five acquisition section pressure measuring holes inside the pressure acquisition section, in order to absorb the unsteady fluctuation energy of the dynamic pressure signal to be measured, to weaken the influence of the cavity-effect in the piezometric tube on the signal to be measured, to prevent the cavity-effect of the pressure measuring holes, and to weaken the distortion influence of the cavity-effect on the signal to be measured. Preferably, each of the flexible wall pressure buffering tubes has a length of 300 mm, and has the tail end thereof closed. The flexible wall pressure buffering tubes can absorb the energy of the dynamic pressure to be measured. The pressure sensing part 1, the pressure measuring hole transition section 2 and the pressure acquisition section 3 may be made of a rigid material, and the flexible wall pressure buffering tubes 5 may be made of a flexible pipe material.

The hemispherical probe tip of the dynamic five-hole probe and the five pressure measuring holes at the surface thereof can be used to acquire the five pressure components of the airflow, which then may be used to calculate the total pressure, static pressure and three-dimensional velocity components of the airflow. The corresponding relationship between the five acquired pressure components and the calculated components needs to be demarcated in a standard wind hole such that a series of airflow yaw and pitch angles are provided under different Mach number conditions. The pressure values in the five holes at various airflow speed and various direction angle states are recorded, and finally a fit of the conversion relationship between the measured pressure values for the five holes and the calculated values is performed for a plane formed by a series of yaw and pitch angles.

The dynamic five-hole probe provided by the embodiment of the disclosure adopts a remote installation manner for the dynamic pressure sensor, for which a systematic identification for the attenuation effect caused by the pressure measuring hole and the related machining error may be made, that is, a demarcation for the dynamic frequency response of the probe may be made. A step signal generated by a shock tube and standard sinusoidal signals of different frequencies are adopted as input signals. Step response characteristic curves and frequency response functions for the five sensors are respectively determined. When the actual measurement is performed, the measured signal is corrected with the frequency response function, ensuring that the dynamic probe's frequency response is not less than 20 kHz.

Based on the main body structure of the above-described probe, the probe holder may be further designed for specific test environments and installation conditions to mount the probes in a suitable position and perform the mechanical actions required for the measurement. The design of the probe holder mainly follows the principle of minimizing the interference to the flow field to be measured as far as possible. Generally, it will be advantageous that the size of the probe holder is as small as possible and the shape of the holder will not cause a large airflow vortex.

The dynamic five-hole probe provided by the disclosure has five pressure sensors installed in the pressure acquisition section, instead of being installed in the pressure sensing part, so that the size of the pressure sensing part, and thus the size of the probe tip, can be greatly reduced, for example to be less than 3 mm, effectively ensuring the spatial resolution of the dynamic five-hole probe.

The dynamic five-hole probe provided by the disclosure adopts the structural design including the pressure measuring hole transition section and the flexible wall pressure buffering tubes, which can effectively prevent the dynamic signal distortion which will be otherwise caused by the cavity-effect, ensure that the dynamic frequency response of the probe is about 20-30 kHz and meet the needs of the unsteady measurement of the general impeller machinery.

The dynamic five-hole probe provided by the disclosure adopts columnar pressure sensors with a simple structure and convenient procurement, and is convenient for machining, installation and operation, ensuring low costs for manufacture and maintenance.

It can be seen from the above technical solutions that the present disclosure has the following advantages:

1. The dynamic five-hole probe provided by the disclosure has five pressure sensors installed in the pressure acquisition section rather than in the pressure sensing part, so that the pressure sensing part, i.e., the size of the probe tip, can be greatly reduced, for example, to be less than 3 mm, which effectively ensures the spatial resolution of the dynamics five-hole probe.

2. The dynamic five-hole probe provided by the disclosure adopts a structural design including the pressure measuring hole transition section and the flexible wall pressure buffering tube, which can effectively prevent the dynamic signal distortion which is otherwise caused by the cavity-effect and ensure the dynamic frequency response of the probe of about 20-30 kHz, meeting the requirements of unsteady measurement of general impeller machinery.

3, The dynamic five-hole probe provided by the disclosure adopts a columnar pressure sensor with a simple structure and convenient procurement, is convenient for machining, installation and operation, and ensures that the probe has low costs for manufacture and maintenance.

The specific embodiments described above further explain the objectives, technical solutions and advantages of the present invention in detail. It should be understood that the above description is only intended for the specific embodiments of the present disclosure, and is not intended to limit the present disclosure. Any modifications, equivalent replacements, improvements and the like made within the spirit and principles of the present disclosure should fall within the scope of the present disclosure.

The invention claimed is:

1. A dynamic five-hole probe, comprising: a pressure sensing part, a pressure measuring hole transition section and a pressure acquisition section; and
a plurality of pressure buffering tubes, wherein a tail end of each of the pressure buffering tubes is closed, and an opposite end of each of the pressure buffering tubes is communicated with a corresponding one of the acquisition section pressure measuring holes to weaken a cavity-effect;
wherein the pressure sensing part is to be placed in a flow field to be measured when in use, and the pressure sensing part is provided with sensing part pressure measuring holes;
wherein the sensing part pressure measuring holes are transited into acquisition section pressure measuring holes of the pressure acquisition section via transition section pressure measuring holes of the pressure measuring hole transition section, and
wherein the acquisition section pressure measuring holes of the pressure acquisition section are configured to measure a dynamic pressure of an airflow.

2. The dynamic five-hole probe according to claim 1, further comprising pressure sensors,
wherein the pressure acquisition section is provided with sensor mounting holes, the sensor mounting holes are communicated with the acquisition section pressure measuring holes, respectively, and the pressure sensors are disposed in the sensor mounting holes to measure the dynamic pressure of the airflow.

3. The dynamic five-hole probe according to claim 2,
wherein a bottom of each of the sensor mounting holes is communicated with a corresponding one of the acquisition section pressure measuring holes through a hole.

4. The dynamic five-hole probe according to claim 2,
wherein the acquisition section pressure measuring holes form a centrally symmetrical structure; and
wherein the number of the sensor mounting holes is the same as the number of the acquisition section pressure measuring holes, and the sensor mounting holes form a centrally symmetrical structure.

5. The dynamic five-hole probe according to claim 2,
wherein the pressure sensing part has a hemispherical structure, the number of the sensing part pressure measuring holes is five, and the five sensing part pressure measuring holes are evenly arranged on a hemispherical surface of the hemispherical structure and penetrate through the hemispherical structure to a bottom section of the hemispherical structure so as to sense three-dimensional dynamic pressure components of the airflow to be measured.

6. The dynamic five-hole probe according to claim 2,
wherein the pressure measuring hole transition section is of an L-shaped structure comprising a horizontal transition section and a vertical transition section,
wherein the horizontal transition section is connected to the pressure sensing part at an upstream position such that the horizontal transition section and the pressure sensing part have a same diameter at a connection position therebetween, and the vertical transition section is connected to the pressure acquisition section at a downstream position such that the vertical transition section and the pressure acquisition section have a same diameter at a connection position therebetween; and
wherein each of the transition section pressure measuring holes is L-shaped, and transits one of the sensing part pressure measuring holes to a corresponding one of the acquisition section pressure measuring holes.

7. The dynamic five-hole probe according to claim 2,
wherein the sensing part pressure measuring holes, the transition section pressure measuring holes and the acquisition section pressure measuring holes are communicated with each other in one-to-one correspondence, and
wherein an outlet section of each of the acquisition section pressure measuring holes is the same in area as an inlet section of the acquisition section pressure measuring hole.

8. The dynamic five-hole probe according to claim 1,
wherein the pressure sensing part has a hemispherical structure, the number of the sensing part pressure measuring holes is five, and the five sensing part pressure measuring holes are evenly arranged on a hemispherical surface of the hemispherical structure and penetrate through the hemispherical structure to a bottom section of the hemispherical structure so as to sense three-dimensional dynamic pressure components of the airflow to be measured.

9. The dynamic five-hole probe according to claim 1,
wherein the pressure measuring hole transition section is of an L-shaped structure comprising a horizontal transition section and a vertical transition section,
wherein the horizontal transition section is connected to the pressure sensing part at an upstream position such that the horizontal transition section and the pressure sensing part have a same diameter at a connection position therebetween, and the vertical transition section is connected to the pressure acquisition section at a downstream position such that the vertical transition section and the pressure acquisition section have a same diameter at a connection position therebetween; and
wherein each of the transition section pressure measuring holes is L-shaped, and transits one of the sensing part pressure measuring holes to a corresponding one of the acquisition section pressure measuring holes.

10. The dynamic five-hole probe according to claim 9,
wherein the transition section pressure measuring holes form a centrally symmetrical structure at an outlet end of the vertical transition section.

11. The dynamic five-hole probe according to claim 1,
wherein the sensing part pressure measuring holes, the transition section pressure measuring holes and the acquisition section pressure measuring holes are communicated with each other in one-to-one correspondence, and wherein an outlet section of each of the acquisition section pressure measuring holes is the same in area as an inlet section of the acquisition section pressure measuring hole.

12. The dynamic five-hole probe according to claim 1,
wherein the pressure sensing part, the pressure measuring hole transition section and the pressure acquisition section are each made of a rigid material, and the pressure buffering tubes are made of a flexible pipe material.

13. The dynamic five-hole probe according to claim 1,
wherein the pressure sensing part has a hemispherical structure, the number of the sensing part pressure measuring holes is five, and the five sensing part pressure measuring holes are evenly arranged on a hemispherical surface of the hemispherical structure and penetrate through the hemispherical structure to a bottom section of the hemispherical structure so as to sense three-dimensional dynamic pressure components of the airflow to be measured.

14. The dynamic five-hole probe according to claim 1,
wherein the pressure measuring hole transition section is of an L-shaped structure comprising a horizontal transition section and a vertical transition section,
wherein the horizontal transition section is connected to the pressure sensing part at an upstream position such that the horizontal transition section and the pressure sensing part have a same diameter at a connection position therebetween, and the vertical transition section is connected to the pressure acquisition section at a downstream position such that the vertical transition section and the pressure acquisition section have a same diameter at a connection position therebetween; and wherein each of the transition section pressure measuring holes is L-shaped, and transits one of the sensing part pressure measuring holes to a corresponding one of the acquisition section pressure measuring holes.

15. The dynamic five-hole probe according to claim 1,
wherein the sensing part pressure measuring holes, the transition section pressure measuring holes and the acquisition section pressure measuring holes are communicated with each other in one-to-one correspondence, and wherein an outlet section of each of the acquisition section pressure measuring holes is the same in area as an inlet section of the acquisition section pressure measuring hole.

* * * * *